Sept. 15, 1942.   P. A. SPERRY   2,295,763

METHOD OF MOLDING SHOE SOLES

Filed Jan. 27, 1940

INVENTOR.
Paul A. Sperry
BY Barlow & Barlow
ATTORNEYS.

Patented Sept. 15, 1942

2,295,763

UNITED STATES PATENT OFFICE 2,295,763

METHOD OF MOLDING SHOE SOLES

Paul A. Sperry, New Haven, Conn., assignor to United States Rubber Company, New York, N. Y., a corporation of New Jersey Application January 27, 1940, Serial No. 315,992

4 Claims. (Cl. 18—55)

This invention relates to a shoe sole, particularly of the type which has an outer bottom surface capable of resisting slipping, such as more fully described in my co-pending application, Serial No. 177,237, filed November 30, 1937, and which has matured into Patent No. 2,206,860, and this invention has for one of its objects to mold a shoe sole in such form that cutting of the sole in the manner described in my co-pending application, Serial No. 158,711, filed August 12, 1937, will be unnecessary.

Another object of the invention is to provide for molding a sole so that it will be comparable to the form provided by cutting and yet may be provided with greater facility and economy.

With these and other subjects in view, the invention consists of certain novel features of construction, as will be more fully described and particularly pointed out in the appended claims.

Figure 1:
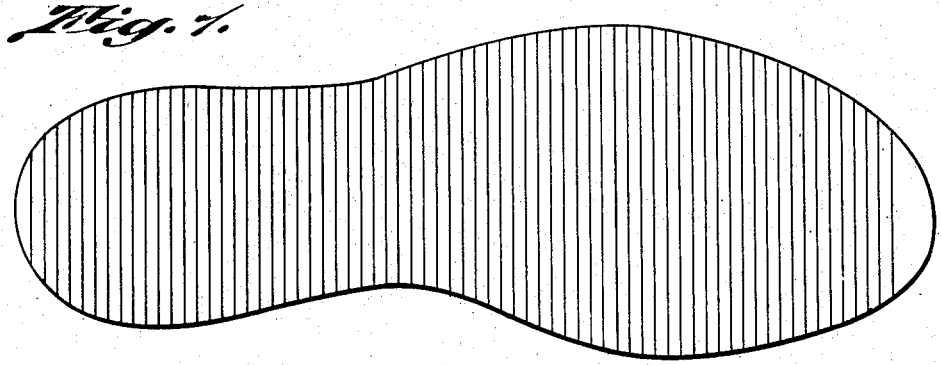
Fig. 1 is a bottom plan view of a finished shoe sole.
Figure 2:
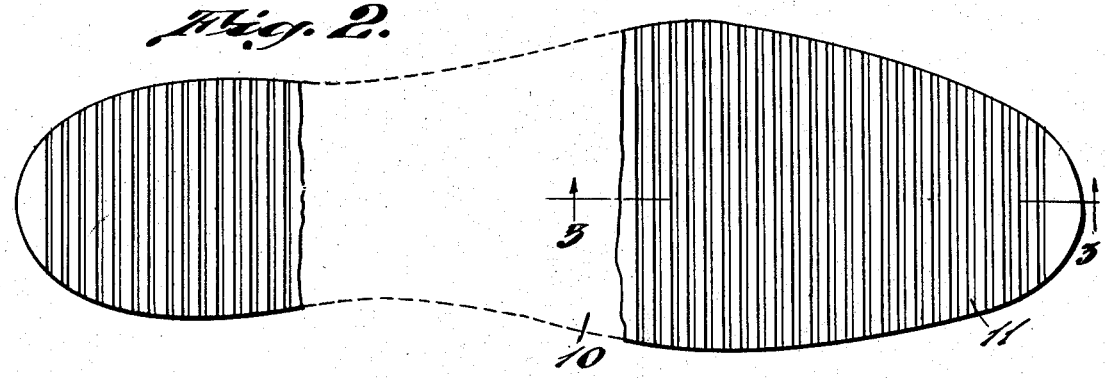
Fig. 2 is a bottom plan view of the sole at one step in the operation of the molding.
Figure 3:
Fig. 3 is a sectional view on substantially line 3—3 of Fig. 1 with powder applied.
Figure 5:
Fig. 5 is an enlarged view with the material forced so as to close the grooves formed as shown in Fig. 3, except for the powder or like material.
Figure 7:
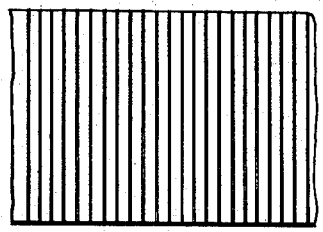
Fig. 7 is a bottom plan of a fragment in the form shown in Fig. 5.
Figure 6:
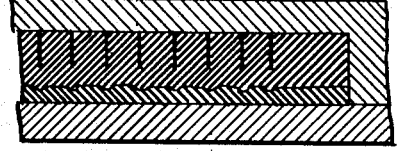
Fig. 6 illustrates the material of Fig. 5, as located in a mold.

In the formation of rubber shoe soles, with sections in contact with each other extending across the shoe sole, the sections are formed by cutting into the shoe sole and stopping short of passing through the shoe sole, such as illustrated in my co-pending application, Ser. No. 177,237, above mentioned. The sole is fed forwardly as the cutting is performed. The operation is a very delicate one and requires careful handling and accurate machine work, and, in order to provide a shoe sole which will have the anti-slipping properties of this article in my last above-mentioned application and which may be formed in a different way, such as by molding, I have molded a sole with grooves extending laterally and of such distance apart as to provide sections of the desired dimension, the molding being done by pressure, leaving the rubber material in a semi-plastic, doughy condition, so that when opposed forces are applied to the material in a lengthwise direction of the sole, the sections will be brought closer together so as to cause the side walls of the grooves to substantially contact, and I provide a means for preventing these walls from sticking together in a known manner. After this foreshortening of the sole is provided, the sole is treated by the usual vulcanizing process and has the qualities such as provided in my co-pending application, Serial No. 177,237; and the following is a more detailed description of the present embodiment of this invention, illustrating the preferred means by which these advantageous results may be accomplished:

With reference to the drawing, 10 designates a shoe sole which by molding is of a length greater than the length desired for the sole in its finished form. Suitable fins 17 in the mold 18 provide grooves 11 extending laterally across the sole. These grooves have substantial width and provide side walls 12 and 13, substantially spaced from one another. The molding is of rubber of a very flexible material, such as described in my above-mentioned article application, and the molding is carried on to an extent of curing of the rubber such that the same is relatively plastic and doughy when taken from the molding. It is possible that this portion of the operation may be performed by calendering.

At this point in the process some sort of treatment is given to walls 12 and 13 of each groove, such, for instance, as placing powder 15 upon these walls, or some Holland cloth or thin material may be inserted which may later be removed, to prevent these walls from contacting and sticking.

The length of the sole is then foreshortened by suitable pressure, such, for instance, as in a mold 14, where the shape of the article may be controlled and the walls 12 and 13 are brought into substantial contact, except for a very thin film of powder as shown in Figs. 5, 6, 7, and 9, so that their surfaces abut or abut except for such separating material as may be placed within the groove which is of a relatively small dimension and is inconsequential. After this foreshortening has been accomplished, the sole is vulcanized, which firmly sets the sole in this shape and maintains the sole with lateral extending slits and flexible sections, such as is required for the anti-slipping surface of the sole. The separating material may then be removed.

Figure 10:
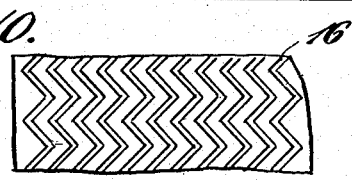
Fig. 10 is a modification of a different shape of groove, extending laterally across the shoe sole, before pressure is applied to close the groove.
Figure 4:
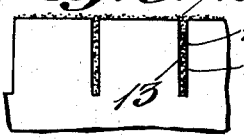
Fig. 4 is a fragment of the mold for the form shown in Fig. 3.
Figure 11:
Fig. 11 is a bottom plan view after the grooves of Fig. 10 have been closed by pressure to move the opposite side walls together.
Figure 8:
Fig. 8 is a greatly enlarged section similar to Fig. 3.
Figure 9:
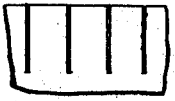
Fig. 9 is a greatly enlarged section similar to Fig. 5.

While I have shown the slits 11 as extending laterally straight across the sole, it is conceivable that other shapes of separated walls of grooves may be provided. Such different separating is shown in Fig. 10 where a zig-zag or serrated shape of groove 16 is provided, and as a sole so formed is susceptible to the same foreshortening, such shape is within the purview of this invention.

The foregoing description is directed towards the method and construction illustrated, but I desire it to be understood that I reserve the privilege of resorting to all the equivalent changes to which the construction and method are susceptible, the invention being defined and limited only by the terms of the appended claims.

I claim:

1. The method of making a slip-retarding shoe sole which comprises shaping a thermoplastic material with lateral grooves in its outer surface, partly curing said sole, protecting the spaced opposed surfaces of the grooves against sticking together, and then permanently reducing the lengthwise dimension of the material united at the base of the grooves by applying opposed forces to the material in the lengthwise direction of the sole so as to cause the wall surfaces of the grooves to approach each other.

2. The method of making a slip-retarding shoe sole which comprises molding and shaping thermoplastic material with lateral grooves in its outer surface when taken from the mold, partly curing said sole, protecting the spaced opposed surfaces of the grooves against sticking together, then compressing the material in a direction at right angles to the grooves to cause the wall surfaces of the grooves to approach each other and contact, and then finishing the curing of the sole.

3. The method of making a slip-retarding shoe sole which comprises shaping a thermoplastic material with lateral grooves in its outer surface extending in a serrated path, partly curing said sole, protecting the spaced opposed surfaces of the grooves against sticking together, and then forcing the material from opposite directions toward each other to cause the wall surfaces of the grooves to approach each other.

4. The method of making a slip-retarding shoe sole which comprises shaping a thermoplastic material with lateral grooves in its outer surface extending in a serrated path, partly curing said sole, protecting the spaced opposed surfaces of the grooves against sticking together, permanently reducing the lengthwise dimension of the material united at the base of the grooves by applying opposed forces to the material in the lengthwise direction of the sole so as to cause the wall surfaces of the grooves to approach each other, and then finishing the curing of the sole.

PAUL A. SPERRY.